No. 765,944. Patented July 26, 1904.

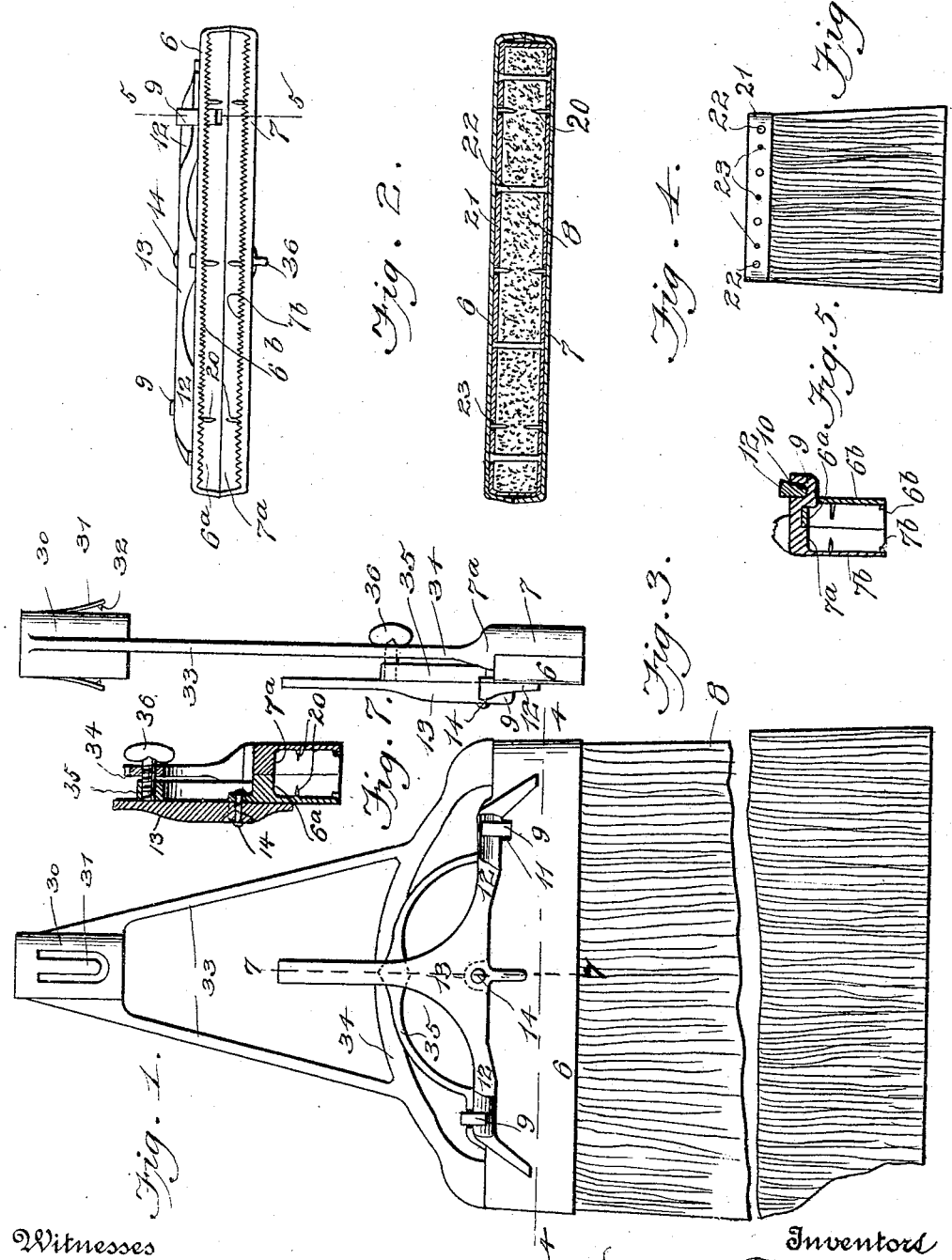

UNITED STATES PATENT OFFICE.

SALMON TUTTLE AND AUGUST G. T. HORN, OF CHICAGO, ILLINOIS.

BROOM.

SPECIFICATION forming part of Letters Patent No. 765,944, dated July 26, 1904.

Application filed March 12, 1904. Serial No. 197,795. (No model.)

*To all whom it may concern:*

Be it known that we, SALMON TUTTLE and AUGUST G. T. HORN, citizens of the United States, residing at Chicago, in the county of Cook and State of Illinois, have invented new and useful Improvements in Brooms, of which the following is a specification.

This invention relates to broom-heads, and comprises especially a head formed in two separate parts, which may be clamped together upon a broom or mop.

The object of the invention is to produce an improved device of the kind characterized particularly by improvement with respect to the means for binding the parts together upon the broom-corn.

The advantages will be evident from the following description and the accompanying drawings, in which—

Figure 1 is a side elevation of the head with a broom therein. Figs. 2 and 3 are respectively bottom and edge views of the broom-head. Fig. 4 is a sectional view on the line 4 4 of Fig. 1. Fig. 5 is a detail in section on the line 5 5 of Fig. 2. Fig. 6 is an elevation of the broom and its binder before being inserted in the head. Fig. 7 is a central transverse vertical section.

The device comprises two parts or jaws, which are indicated, respectively, at 6 and 7, being plates which extend across the top of the broom and between which said broom (indicated at 8) is clamped. The plates have at the top edge inwardly-projecting flanges $6^a$ and $7^a$, which meet above the top of the broom, and at the bottom edge have teeth $6^b$ and $7^b$, which grip the broom-corn therebetween.

Projecting inwardly from the upper edge of the plate 7 are a pair of lugs 9, which are notched at 10 on opposite sides or edges. These lugs extend through notches 11, formed in the plate 6, in which position the notches 10 are adapted to receive to effect the clamping action beveled or wedge-shaped arms 12, projecting oppositely from the foot of a lever 13, which is fastened to the plate 6 by a pivot-bolt at 14. The arms 12 are wedge-shaped in cross-section, being beveled oppositely, so that when the handle is turned on the pivot 14 the narrow edge of the arms 12 will enter the notches 10 and by the wedge action draw the plates 6 and 7 together, thereby firmly and securely clamping the broom therebetween. The leverage afforded by the lever and arms is such that the plates may be strained together tightly upon the broom-corn. The amount of corn placed between the jaws is such that when the lever is brought to a right angle to the length of the plates the latter will be firmly clamped together.

The handle-socket is indicated at 30 and has produced in opposite sides thereof tongues 31, carrying inwardly-projecting pins 32. The parts are formed of malleable iron, and the tongues are first sprung out so that the handle can be inserted, after which they are hammered in, driving the pin in the handle and holding the latter firmly in the socket. Two arms 33 extend from the socket toward opposite ends of the plate 7 and join an arch-piece 34, which extends between the ends of the plate 7 and fits against a corresponding arch-piece 35, extending between the ends of the plate 6. These arch-pieces are connected together by a thumb-screw 36, which extends through one piece into a threaded socket in the other and binds the parts together.

The action is quick and effective. To drop out an old broom, it is simply necessary to knock the lever to one side with sufficient force to overcome the bind between the arms 12 and the lugs and remove the thumb-screw, when the plates will at once drop apart, and a new broom may be inserted, which is then clamped by turning or straining the handle in the manner above described. The parts are made of metal and are few and simple, and the use of tools to remove or replace the broom is unnecessary. Mop-rags may be clamped between the jaws in a similar manner. The fit of the lugs in the notches prevent lateral movement of the jaws with respect to each other.

In addition to the teeth $6^b$ and $7^b$ the plates 6 and 7 have oppositely-disposed pins 20 for the purpose of assisting the grip on the broom. The broom-corn is bound at the top by a metal band 21 and rivets 22, extending through, and this metal band has holes 23, into which the pins 20 enter when the parts are assembled. The teeth 6ᵇ and 7ᵇ take hold of the corn below the band, and the pins 20 engage the band by entry into the holes 23. This holds the broom securely in place. When the broom becomes worn out, the plates are loosened and the old broom removed and a new one inserted. The same head may thus be used repeatedly and being strongly constructed will last indefinitely.

What we claim as new, and desire to secure by Letters Patent, is—

1. The combination in a broom or mop head, of jaws between which the material of the broom or mop is clamped, one of said jaws having projecting lugs, and a lever pivoted to the other jaw and having wedge-shaped arms engaging the lugs, to bind the jaws together.

2. The combination in a broom or mop head, of jaws between which the material is clamped, one of said jaws having lugs and the other having locking-arms pivoted thereto and notches through which the lugs project, said arms having inclined surfaces which engage the lugs, to bind the jaws together.

3. The combination with a broom having a binding-band around the top with holes therein, of a broom-head having clamping-jaws with pins on the inside arranged to enter said holes and which jaws engage the sides of the broom below the said band.

In testimony whereof we have signed our names to this specification in the presence of two subscribing witnesses.

SALMON TUTTLE.
    AUGUST G. T. HORN.

Witnesses:
 SIGNA FELTSKOG,
 H. G. BATCHELOR.